United States Patent
Kim

(10) Patent No.: US 9,327,396 B2
(45) Date of Patent: May 3, 2016

(54) TELE-OPERATION SYSTEM AND CONTROL METHOD THEREOF

(71) Applicant: SAMSUNG ELECTRONICS CO., LTD., Suwon-si, Gyeonggi-do (KR)

(72) Inventor: Kyung Rock Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 135 days.

(21) Appl. No.: 13/766,886

(22) Filed: Feb. 14, 2013

(65) Prior Publication Data

US 2013/0211592 A1    Aug. 15, 2013

(30) Foreign Application Priority Data

Feb. 15, 2012  (KR) .................... 10-2012-0015542

(51) Int. Cl.
*B25J 3/00* (2006.01)
*B25J 13/00* (2006.01)
*G06F 3/01* (2006.01)

(52) U.S. Cl.
CPC .. *B25J 3/00* (2013.01); *B25J 13/00* (2013.01); *G06F 3/017* (2013.01); *G05B 2219/35444* (2013.01); *G05B 2219/39449* (2013.01); *G05B 2219/39451* (2013.01)

(58) Field of Classification Search
CPC ............. G06F 3/017; B25J 3/00; B25J 13/00; A61B 2017/00207; G06K 9/00355; G06K 9/00375; G05B 2219/39449; G05B 19/39451; G05B 19/35444

USPC .............. 703/1; 700/245, 250–252, 257–259; 463/31; 348/114
See application file for complete search history.

(56) References Cited

U.S. PATENT DOCUMENTS

| | | | |
|---|---|---|---|
| 5,745,387 A * | 4/1998 | Corby et al. ...................... 703/1 |
| 7,714,895 B2 | 5/2010 | Pretlove et al. | |
| 7,818,091 B2 | 10/2010 | Kazi et al. | |
| 2004/0128012 A1* | 7/2004 | Lin ............................... 700/100 |
| 2009/0088898 A1* | 4/2009 | Nihei et al. .................... 700/253 |
| 2012/0230550 A1* | 9/2012 | Kraut ............................. 382/113 |

FOREIGN PATENT DOCUMENTS

KR    10-2011-0042277    4/2011

OTHER PUBLICATIONS

Kofman et al, Teleoperation of a Robot Manipulator Using a Vision-Based Human-Robot Interface, IEEE Transactions on Industrial Electronics, col. 52, No. 5, Oct. 2005.*

(Continued)

*Primary Examiner* — Khoi Tran
*Assistant Examiner* — Abby Lin
(74) *Attorney, Agent, or Firm* — Harness, Dickey & Pierce, P.L.C.

(57) ABSTRACT

A tele-operation system enabling a robot arm to move by following a motion of a motion of a hand of a user without an additional mechanical apparatus, the tele-operation system including a slave robot having a robot arm, a master console configured to detect a gesture of a user, and to control the slave robot from a remote place so that the slave robot moves by following the gesture of the user.

21 Claims, 8 Drawing Sheets

(56) References Cited

OTHER PUBLICATIONS

Seyed Ghobadi et al, Real Time Hand Based Robot Control Using Multimodel Images, IAENG International Journal of Computer Science, 35:4, IJCS_35_4_08, Nov. 2008.*

Kowbrainz, Wii Play-296 in Table Tennis, Youtube, Jan. 13, 2007, screenshots provided.*

Previews: Wii Remote: An in-depth analysis, ComputerandVideoGames, Oct. 9, 2006.*

* cited by examiner

TELE-OPERATION SYSTEM AND CONTROL METHOD THEREOF

CROSS-REFERENCE TO RELATED APPLICATIONS

This application claims the benefit of Korean Patent Application No. 10-2012-0015542, filed on Feb. 15, 2012, in the Korean Intellectual Property Office, the disclosure of which is incorporated herein by reference.

BACKGROUND

1. Field

Embodiments of the present disclosure relate to a tele-operation system capable of controlling a robot from a remote place.

2. Description of the Related Art

A tele-operation system is being developed that controls a robot, which is performing a work, from a safe, remote place apart from a working environment.

Particularly, various tele-operation technologies are being introduced to control a robot, which is provided with robot arms, from a remote place for the robot to perform various works.

As for the tele-operation technologies as such, a method of tele-operating a robot by use of a joystick by a user, and a method of controlling a robot as a user wears a mechanical master apparatus are generally known.

The tele-operation technologies as such provide a control environment that is not intuitive as a result of implementing a motion of robot arms by use of a mechanical command in the form of mapping or conversion, and the motion of a user and the motion of the robot are not matched with each other, longer time is needed for the user to become familiar with the controlling of the robot arms, and in a case of a complicated work, a difficulty is present in controlling the robot arms in a swift manner.

SUMMARY

Therefore, it is an aspect of the present disclosure to provide a tele-operation system configured in a way that the robot arms are moved by following the motions of the hands of a user without a separate mechanical apparatus.

Additional aspects of the disclosure will be set forth in part in the description which follows and, in part, will be apparent from the description, or may be learned by practice of the disclosure.

In accordance with one aspect of the present disclosure, a tele-operation system includes a slave robot and a master console. The slave robot may include a robot arm. The master console may be configured to detect a gesture of a user, and to control the slave robot from a remote place so that the slave robot moves by following the gesture of the user.

The slave robot may include a sensor configured to detect a work environment of the slave robot.

The sensor may include a three-dimensional depth sensor (3D depth sensor).

The slave robot may include a slave control unit that may be configured to transmit information detected by the sensor to the master console, and to control the robot arm according to a command of the master console.

The slave control unit may be configured to determine space coordinates of the robot arm through the sensor, and to transmit the determined space coordinates of the robot arm to the master console.

The slave control unit may be configured to receive space coordinates of a hand of the user from the master console and convert the received space coordinates to be suitable for the space coordinates of the robot arms, and to transmit the converted space coordinates to the master console.

The slave control unit may be configured to control the robot arm by converting the command of the master console to be suitable for the space coordinates of the robot arm.

The master console may include a sensor to detect the gesture of the user.

The sensor may include a three-dimensional depth sensor (3D depth sensor).

The master console may include a display unit configured to display an image showing the work environment of the slave robot transmitted from the slave robot, and to display the gesture of the user detected by the sensor on the image in a form of augmented reality.

The display unit may be configured to display the robot arm of the slave robot, display a hand of the user detected by the sensor in a form of augmented reality, and display a matching position, at which the hand of the user being displayed in the form of augmented reality is needed to be positioned to control a motion of the robot arm.

The display unit may be configured to display a space coordinate system of the hand of the user and a space coordinate system of the robot arm.

The display unit may be configured to display various information provided to manipulate the slave robot.

The tele-operation system may further include a master control unit. The master control unit may be configured to transmit a driving signal to the slave robot so that the slave robot moves by following the gesture of the user detected by the sensor.

The master control unit may be configured to determine space coordinates of the hand of the user through information detected by the sensor.

The master control unit may be configured to transmit the determined space coordinates of the hand of the user to the slave robot.

The master control unit may be configured to receive space coordinates of the robot arm from the slave robot, and to convert the received space coordinates of the robot arm to be suitable for the space coordinates of the hand of the user.

The master control unit may be configured to transmit the converted space coordinates to the slave robot.

The master control unit, when the hand of the user is moved after the hand of the user is positioned at the matching position of the robot arm that is displayed on the display unit, may be configured to transmit a driving signal to the slave robot so that the robot arm of the slave robot moves by following a motion of the hand of the user.

The master control unit, when the hand of the user positioned at the matching position of the robot arm is moved at a faster speed than a predetermined speed, may be configured to stop a tele-operation of the slave robot by stopping transmitting the driving signal to the slave robot.

In accordance with another aspect of the present disclosure, a method of controlling a tele-operation system having a master console and a slave robot is as follows. A robot arm of the slave robot and a hand of a user on a display unit of the master console may be displayed. Whether the hand of the user displayed on the display unit is matched to the robot arm displayed on the display unit may be determined. A driving signal may be transmitted to the slave robot positioned at a remote place from the master console if the hand of the user displayed on the display unit is matched to the robot arm of the slave robot displayed on the display unit, so that the robot arm of the slave robot moves by following a motion of the hand of the user.

The displaying of the robot arm of the slave robot and the hand of the user on the display unit of the master console is achieved by performing as follows. The robot arm may be displayed on the display unit of the master console. The hand of the user may be displayed on the display unit in a form of augmented reality by detecting a gesture of the user. A matching position, at which the hand of the user being displayed in the form of augmented reality is needed to be positioned to control the motion of the robot arm of the slave robot, may be displayed on the robot arm.

The determining of whether the hand of the user displayed on the display unit is matched to the robot arm displayed on the display unit may be achieved by performing as follows. Whether the hand of the user is positioned at the matching position being displayed on the robot arm and whether space coordinates of the hand of the user are matched with space coordinates of the robot arm may be determined.

The transmitting of the driving signal to the slave robot positioned at the remote place from the master console, so that the robot arm of the slave robot moves by following the motion of the hand of the user may be achieved by performing as follows. The motion of the hand of the user may be detected by the master console. A driving signal may be transmitted to the slave robot, so that the robot arm of the slave robot positioned at the remote place from the master console moves by following the motion of the hands of the user.

As described above, a robot at a remote place may be intuitively controlled by a user.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
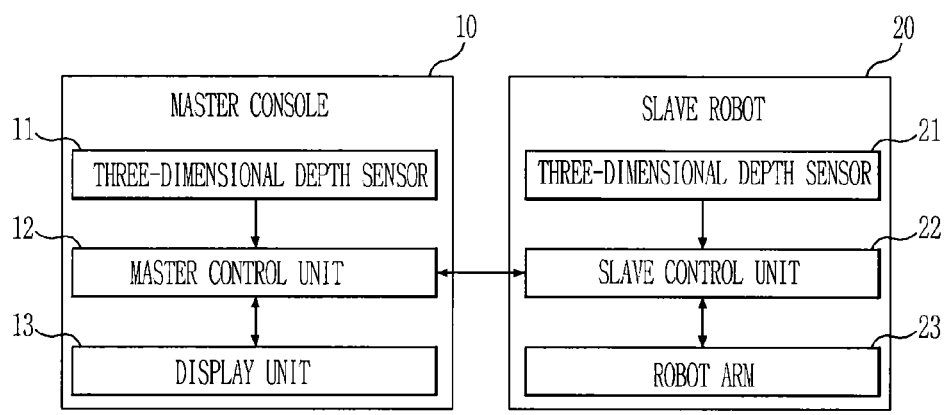
FIG. 1 is a block diagram showing the configuration of a tele-operation system in accordance with one embodiment of the present disclosure.

Reference will now be made in detail to the embodiments of the present disclosure, examples of which are illustrated in the accompanying drawings, wherein like reference numerals refer to like elements throughout.

Figure 2:
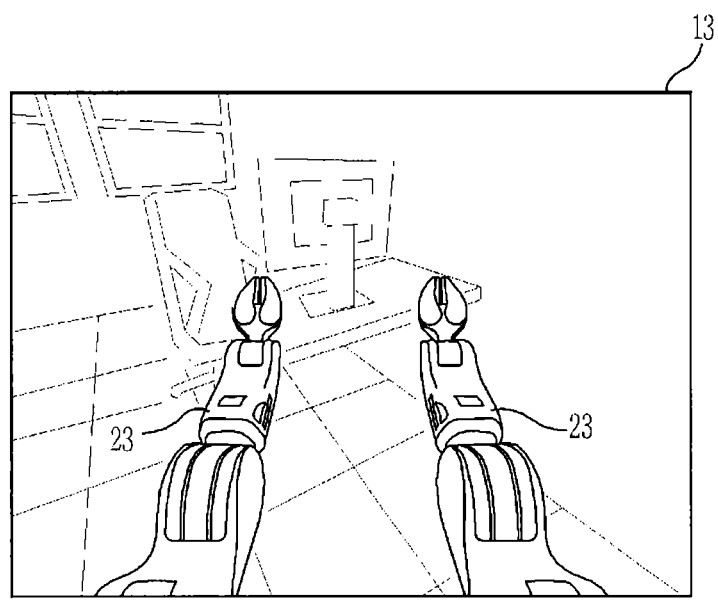
FIG. 2 is a drawing showing a work space of a slave robot being displayed at a display unit of a master console in accordance with one embodiment of the present disclosure.
Figure 3:
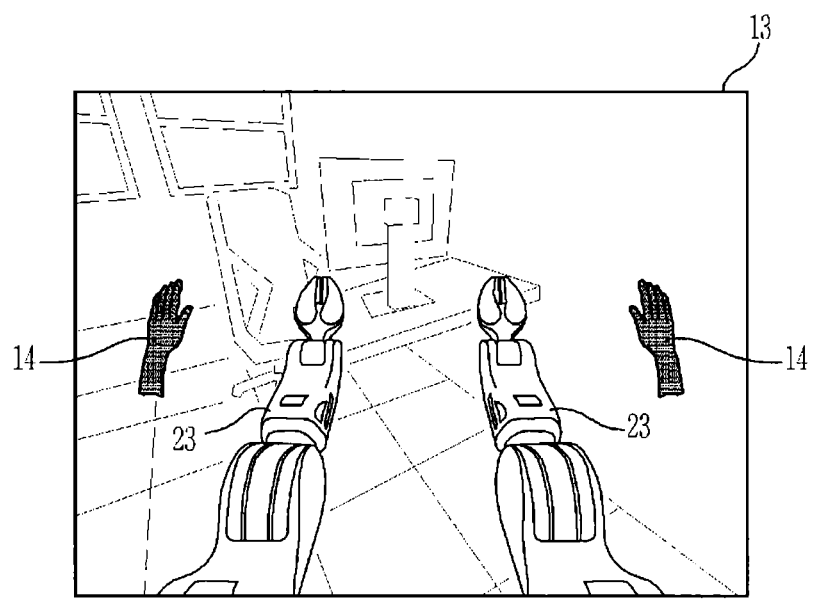
FIG. 3 is a drawing showing the hands of a user being displayed at the display unit of the master console in the form of an augmented reality in accordance with one embodiment of the present disclosure.

FIG. 1 is a block diagram showing a structure of a tele-operation in accordance with one embodiment of the present disclosure, FIG. 2 is a drawing showing a work space of a slave robot being displayed on a display unit 13 of a master console 10 in accordance with one embodiment of the present disclosure, and FIG. 3 is a drawing showing hands 14 of a user on the display unit 13 of the master console 10 in the form of an augmented reality in accordance with one embodiment of the present disclosure.

The tele-operation system includes the master console 10 and the slave robot 20.

The master console 10 is configured to provide a manipulation environment so that a user may be able to manipulate the slave robot. The master console 10 is positioned at a remote place from the place at which the slave robot is positioned, and is configured for a user to manipulate the slave robot at the remote place at which the master console 10 is positioned.

The master console 10 includes a sensor 11, a display unit 13, and a master control unit 12.

The sensor 11, by detecting the gestures of a user, delivers the information related to the gestures of the user to the master control unit 12.

As for the sensor 11, a three-dimensional depth sensor (3D depth sensor) may be used.

The 3D depth sensor 11 is configured to recognize the gestures of a user, and the 3D depth sensor 11 radiates infrared light, which is invisible to human eyes, in pixel units at a subject, and by receiving the infrared light being reflected from the subject, the distance per pixel is calculated. Based on the calculated by-pixel distance, a depth image of the subject is generated in real time to recognize the three-dimensional gesture of the subject.

The 3D depth sensor 11 includes an infrared light projector to radiate infrared light in pixel units, an IR CMOS to receive the infrared light being reflected and then returned, and a color CMOS to generate a color image.

The 3D depth sensor 11 may be integrated with the display unit 13 while mounted at the display unit 13, or may be used separately from the display unit 13.

The display unit 13 is configured to display a work environment of the slave robot.

FIG. 2 shows a work space of the slave robot being displayed at the display unit 13. The slave robot also includes a sensor 21, and the information, which is related to the work space of the surroundings of the slave robot, recognized by the sensor 21 is delivered to the master control unit 12, and is displayed at the display unit 13. The slave robot and the sensor 21 included in the slave robot will be described later.

As shown on FIG. 2, at the display unit 13, robot arms 23 being used at a work, as well as a work space at which a work of the robot arms 23 of the slave robot is performed, is displayed.

FIG. 3 is a drawing showing the hands 14 of a user at the display unit 13 of the master console 10 in the form of an augmented reality in accordance with one embodiment of the present disclosure.

As shown on FIG. 3, the hands 14 of a user, which are detected at the sensor 11 of the master console 10, are displayed at the display unit 13 by being added in the form of an augmented reality to the work environment of the slave robot, which is already displayed at the display unit 13.

Since the gestures of the user are recognized by the sensor 11 of the master console 10, when a change is taken place with respect to the motions of the hands of the user, the change as such is directly displayed on the display unit 13.

That is, when a user moves the hands of the user in front of the display unit 13, the motion of the user as such is detected at the 3D depth sensor 11, and the motions of the hands of the user as such are displayed by being added to the image, which shows the work environment of the slave robot that is already being displayed, in the form of an augmented reality.

In addition, at the robot arms 23 of the slave robot being displayed at the display unit 13, matching positions 15, at which the hands 14 of a user being displayed in the form of an augmented reality are needed to be positioned to control the motions of the robot arms 23, are displayed.

Figure 4:
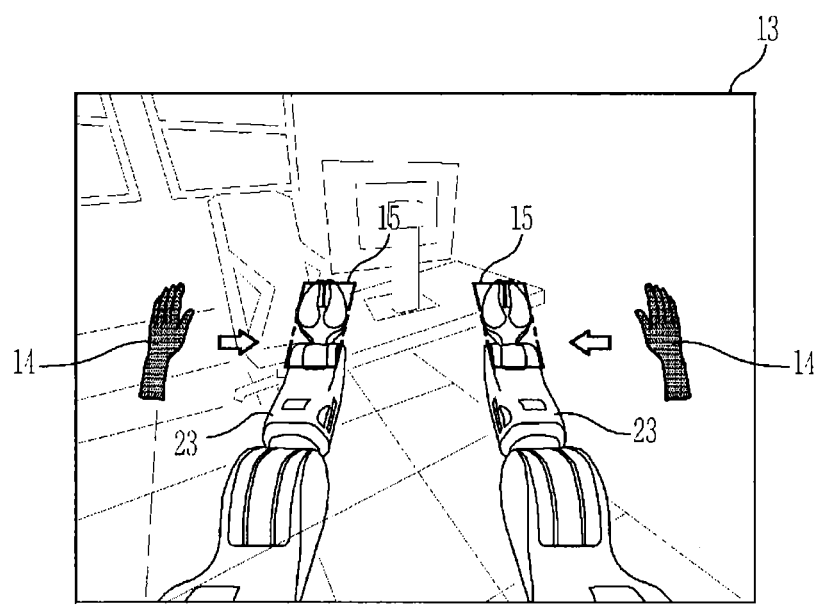
FIG. 4 is a drawing showing matching positions, at which the hands of the user are needed to be matched, displayed at the robot arms displayed at the display unit of the master console in accordance with one embodiment of the present disclosure.

As shown on FIG. 4, the matching positions 15 at which the hands 14 of a user are needed to be matched are displayed at the portions that correspond to the hands of the robot arms 23.

Thus, a user may be able to position the hands 14 of the user at the matching positions 15 displayed at the robot arms 23 by moving the hands 14 of the user.

When the hands 14 of the user displayed at the display unit 13 as an augmented reality are positioned at the matching positions 15 and are matched with the matching positions 15, the robot arms 23 follows the motions of the hands 14 of the user.

In order for the hands 14 of the user and the matching positions 15 displayed at the robot arms 23 to be precisely matched each other, coordinate systems 16 and 17 may be displayed at the hands 14 of the user and the matching positions 15 being displayed at the robot arms 23, respectively.

Figure 5:
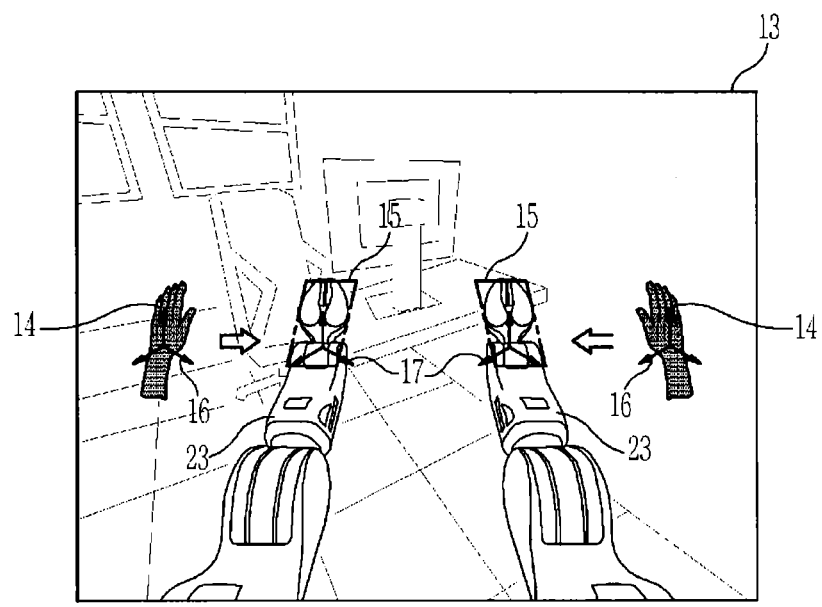
FIG. 5 is a drawing showing a space coordinate system being displayed at the hands of the user and the robot arms, which are displayed at the display unit of the master console, in accordance with one embodiment of the present disclosure.

As illustrated on FIG. 5, a three-dimensional coordinate system 16 is additionally displayed at the hands 14 of a user displayed at the display unit 13 while a three-dimensional coordinate system 17 is additionally displayed at the robot arms 23 as well, and thus the user may be able to match the hands 14 of the user with the robot arms 23 in a further precise manner by having the coordinate system 16 displayed at the hands 14 of the user to be matched with the coordinate system 17 displayed at the matching positions 15 of the robot arms 23.

When the hands 14 of the user are precisely positioned at the matching positions 15 of the robot arms 23, the display unit 13 is configured to display a signal to notify the above to the user. The type of the signal is not limited hereto.

Figure 6:
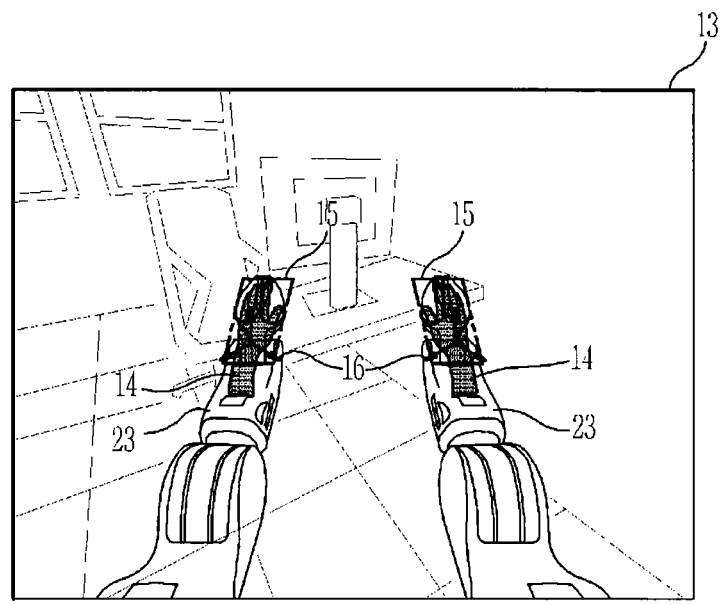
FIG. 6 is a drawing showing the hands of the user being positioned at the matching positions of the robot arms displayed at the display unit of the master console in accordance with one embodiment of the present disclosure.

As illustrated on FIG. 6, after the matching positions 15 of the robot arms 23 displayed at the display unit 13 are matched with the hands 14 of the user, when the user moves the hands 14 of the user to desired directions by referring to the display unit 13, the robot arms 23 moves by following the movement of the above.

That is, the robot arms 23 of the slave robot positioned at a remote place afar from the master console 10 are moved in the same manner as the motions of the hands 14 of the user that are present at the place where the master console 10 is positioned, and an image of the robot arms 23 moving according to the motions of the hands 14 of the user is displayed at the display unit 13 of the master console 10, so that the user may be able to acknowledge whether the robot arms 23 are in a proper course of following the motions of the hands 14 of the user. The detailed description of the above will be provided in the description of the master control unit 12.

Figure 7:
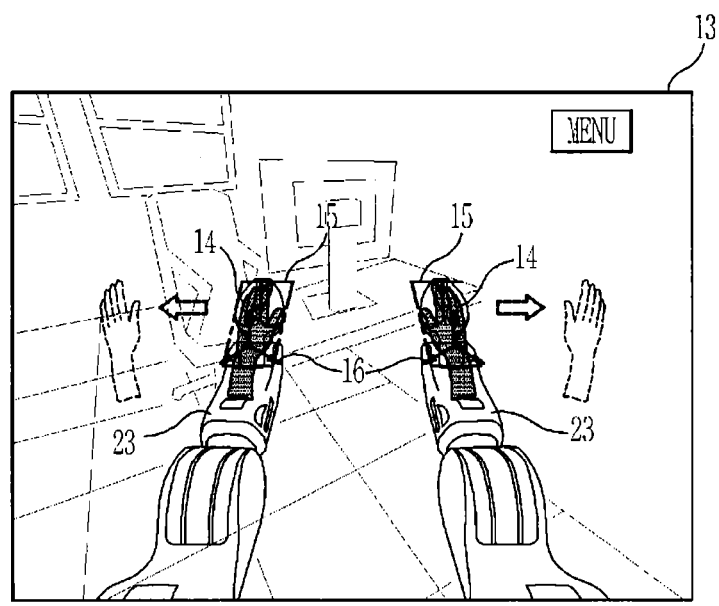
FIG. 7 is a drawing showing the hands of the user, which are displayed at the display unit of the master console, being diverged from the matching positions displayed at the robot arms in accordance with one embodiment of the present disclosure.

As illustrated on FIG. 7, in a case when a user moves the hands 14 of the user at a speed greater than a predetermined speed, the hands 14 of the user are diverged from the matching positions 15, and thus the motions of the robot arms 23 are stopped to a state where the robot arms 23 are at the time when the hands 14 of the user are diverged from the matching positions 15.

That is, the user may stop a work or perform a different work by moving the hands 14 at a speed greater than the predetermined speed to diverge from the matching positions 15.

At the display unit 13, a menu bar is displayed, so that a user may perform various types of work through the menu bar.

The master control unit 12 is configured to calculate space coordinates of the hands 14 of a user on a user space through the information detected by the sensor 11 of the master console 10, and the master control unit 12 also configured to receive space coordinates of the robot arms 23 of a robot space, which are calculated through the information detected by the sensor 21 of the slave robot, from the slave robot.

The master control unit 12 converts the space coordinates of the robot arms 23 on the robot space, which are received from the slave robot, into coordinates on the user space.

The master control unit 12, by converting the space coordinates of the robot arms 23 into the coordinates on the user space as the above such that the robot arms 23 and the hands 14 of a user share the same coordinate space, enables the robot arms 23 to be displayed at the display unit 13 of the master console 10, and also enables the hands 14 of the user to be displayed at the display unit 13 in the form of an augmented reality. Here, having the space coordinates of the robot arms 23 converted into the coordinates on the user space is described as one example, but the space coordinates of the hands 14 of a user may be converted into the space coordinates system on the robot space of the slave robot.

In addition, the master control unit 12 transmits the space coordinates of the hands 14 of a user, which are calculated through the information detected at the sensor 11 of the master console 10, to the slave robot. The converting of the coordinates described above is preferred to be performed at the master control unit 12, but the converting of the coordinates may be performed at the slave robot by having the space coordinate system of the hands 14 of the user transmitted from the master control unit 12 to the slave robot. In a case when the converting of the coordinates is performed at the slave robot, the slave robot may be able to transmit the converted coordinate information again to the master control unit 12.

In addition, the master control unit 12, as described above, when the hands 14 of a user and the robot 23 are matched with each other as the hands 14 of the user displayed at the display unit 13 are positioned at the matching positions 15 of the robot arms 23, generates a driving signal and transmits the driving signal to the slave robot, so that the robot arms 23 of the slave robot at a remote place may follow the motions of the hands 14 of the user. The slave robot receives the driving signal of the master console 10, and drives the robot arms 23 so that the robot arms 23 may follow the motions of the hands 14 of the user.

The master control unit 12, prior to transmitting the driving signal, converts the driving signal to be suitable for the coordinates on the robot space, and then transmits the converted driving signal, or the driving signal transmitted from the master control unit 12 may be converted into the coordinates on the robot space at the slave robot.

When the robot arms 23 are moved according to the driving signal, the sensor 31 of the slave robot detects the motion of the robot arms 23, and the slave robot transmits the information related to the actual motions of the robot arms 23 to the master control unit 12. The master control unit 12, through the information above, displays on the display unit 13 that the motions of the robot arms 23 are being changed by following the motions of the hands 14 of a user.

In order to confirm whether the motions of the robot arms 23 according to the driving signal are in a proper course of following the motions of the hands 14 of a user, the slave robot may transmit a feedback signal to the master control unit 12. The master control unit 12, by receiving the feedback signal as such, may adjust the driving signal by determining whether the motions of the robot arms 23 are in a proper course of following the motions of the hands 14 of the user.

The slave robot includes the sensor 21, the robot arms 23, and a slave control unit 22.

The sensor 21 is mounted at the slave robot, and detects a work space at which the slave robot is positioned, as well as an object that is present at the work space, and transmits the information related to the above to the slave control unit 22. The slave control unit 22 transmits the information detected by the sensor 21 to the master control unit 12, so that the work space of the slave robot may be displayed at the display unit 13.

As for the sensor 21, the same as the sensor 11 of the master control 10 described above, a 3D depth sensor may be used. The description of the above will be omitted since the description of the above is same as the description with respect to the sensor 11 of the master console 10.

The robot arms 23, since the robot arms 23 move by following the motions of the arms of a human, are desired to be multi-joint robot arms 23 composed of multiple joints as the arms of a human. At the robot arms 23, robot hands that correspond to the hands 14 of a human are desired to be provided, so that the robot hands may be able to grab an object. The number of the robot arms 23 is not limited, but is desired to be two units thereof or a one unit thereof.

The slave control unit 22 is configured to control the overall motions of the slave robot.

The slave control unit 22, through the information detected at the sensor 21 of the slave robot, calculates space coordinates of the robot arms 23 on the robot space, and transmits such to the master control unit 12. The master control unit 12 converts the space coordinates system of the robot arms 23 on the robot space, which are received from the slave robot, into coordinates on the user space.

In addition, the slave control unit 22, by receiving space coordinates of the hands 14 of a user from the master control unit 12, may be able to convert the received space coordinates of the hands 14 of the user into space coordinates on the robot space.

As described above, the converting of the coordinates as such may be performed while having the space coordinates on the robot space as a reference, or while having the space coordinates on the user space as a reference. Since the space coordinates of the hands 14 of a user and the space coordinates of the robot arms 23 of the slave robot, which exist at different spaces to each other, may be converted into the coordinates on the same space, the converting of the coordinates may be made by having the space coordinates on the robot space as a reference or by having the space coordinates on the user space as a reference, and the converting as such may be performed at the master control unit 12 or at the slave control unit 22.

The slave control unit 22 drives the robot arms 23 by receiving the driving signal of the robot arms 23 from the master control unit 12.

The slave control unit 22 converts the driving signal being transmitted from the master control unit 12 into coordinates on the robot space, and controls the motions of the robot arms 23 according to the converted driving signal.

Alternatively, prior to transmitting a driving signal from the master control unit 12, the driving signal may be converted to be suitable for the coordinates on the robot space, and then the converted driving signal may be transmitted to the slave robot.

When the robot arms 23 are moved according to the driving signal, the sensor 21 of the slave robot detects the motions of the robot arms 23, and the slave control unit 22 transmits the information related to the actual motions of the robot arms 23 to the master control unit 12. The master control unit 12, through the information as such, displays on the display unit 13 that the motions of the robot arms 23 are being changed by following the motions of the hands 14 of a user.

In order to confirm whether the motions of the robot arms 23 according to the driving signal are in a proper course of following the motions of the hands 14 of a user, the slave control unit 12 may transmit a feedback signal to the master control unit 12. The master control unit 12, by receiving the feedback signal as such, may determine whether the motions of the robot arms 23 are in a proper course of following the motions of the hands 14 of the user, and then may adjust the driving signal.

Figure 8:
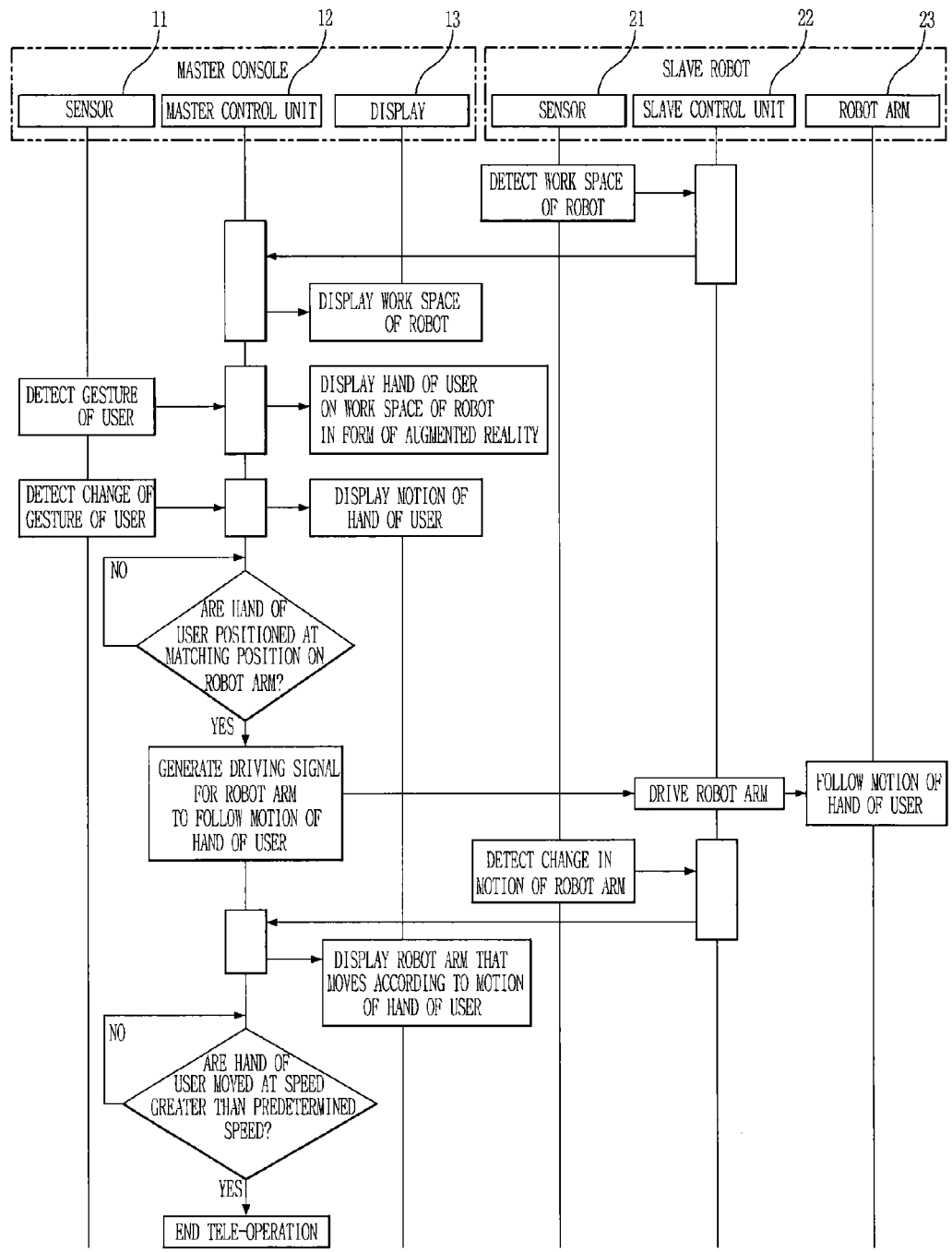
FIG. 8 is a flow chart showing a motion of a tele-operation system in accordance with one embodiment of the present disclosure.

FIG. 8 is a flow chart showing a motion of a tele-operation system in accordance with one embodiment of the present disclosure.

As illustrated on FIG. 8, a work space at which a work of the slave robot is being performed is detected by the sensor 21 of the slave robot, and the signal detected by the sensor 21 is transmitted to the slave control unit 22.

The slave control unit 22 transmits the detected signal related to the work space to the master control unit 12, and the master control unit 12 receives the signal, and controls the display unit 13 so that the work space at which a work of the slave robot is being performed is displayed at the display unit 13 of the master console 10.

The sensor 11 of the master console 10 detects the gestures of a user, and transmits the signal detected by the sensor 11 to the master control unit 12, and the master control unit 12 displays the hands 14 of the user on the display unit 13, on which the work space where the slave robot is being performed is displayed, in the form or an augmented reality.

The sensor 11 of the master console 10 detects the change in the gestures of a user, and transmits the signal detected by the sensor 11 to the master control unit 12, and the master control unit 12 displays the motions of the hands 14 of the user on the display unit 13.

The master control unit 12 determines whether the hands 14 of a user displayed at the display unit 13 are positioned at the matching positions 15 displayed on the robot arms 23.

The master control unit 12, if determined that the hands 14 of the user are positioned at the matching positions 15 and that the hands 14 of the user are matched with the robot arms 23, generates a driving signal that drives the robot arms 23 for the motions of the robot arms 23 to follow the motions of the hands 14 of the user, and transmits the driving signal to the slave control unit 22.

The slave control unit 22 drives the robot arms 23 by receiving the driving signal. The slave control unit 22 may be able to convert the driving signal into the space coordinates on the robot space.

The robot arms 23 that move according to the driving signal are detected by the sensor 21 of the slave robot, and the sensor 21 transmits the detected signal to the slave control unit 22, and then the slave control unit 22 transmits the detected signal as such to the master control unit 12. The master control unit 12 receives the detected signal, and displays the robot arms 23, which move according to the motions of the hands 14 of a user, on the display unit 13.

A user positioned at the master console 10, while checking the robot arms 23 of the slave robot that move according to the hands 14 of the user, adjusts the motions of the hands 14 of the user.

When the motions of the hands 14 of the user are performed at a speed greater than a predetermined speed, and the hands 14 of the user are diverged from the matching positions 15 displayed on the robot arms 23, the master control unit 12 ends a tele-operation of the robot arms 23 until a next command is input by the user.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A tele-operation system, comprising:
   a slave robot comprising a real robot arm; and
   a master console configured to control the slave robot from a remote place so that the slave robot moves by following a real hand of a user, the master console including
   a sensor configured to detect the real hand of the user,
   a display unit configured to display the real robot arm of the slave robot in a form of augmented reality, display the real hand of the user detected by the sensor in the form of augmented reality, and display a matching position of the real robot arm, the matching position being a position at which the real hand of the user displayed in the form of augmented reality is matched to the real robot arm displayed in the form of augmented reality to begin to control a motion of the real robot arm.

2. The tele-operation system of claim 1, wherein:
   the slave robot comprises a sensor configured to detect a work environment of the slave robot.

3. The tele-operation system of claim 2, wherein:
   the sensor comprises a three-dimensional (3D) depth sensor.

4. The tele-operation system of claim 2, wherein:
   the slave robot comprises a slave control unit configured to transmit information detected by the sensor to the master console, and to control the real robot arm according to a command of the master console.

5. The tele-operation system of claim 4, wherein:
   the slave control unit is configured to determine space coordinates of the real robot arm through the sensor, and to transmit the determined space coordinates of the real robot arm to the master console.

6. The tele-operation system of claim 4, wherein:
   the slave control unit is configured to receive space coordinates of the real hand of the user from the master console and convert the received space coordinates to correspond to space coordinates of the real robot arm, and transmit the converted space coordinates to the master console.

7. The tele-operation system of claim 4, wherein:
   the slave control unit is configured to control the real robot arm by converting the command of the master console to correspond to space coordinates of the real robot arm.

8. The tele-operation system of claim 1, wherein:
   the sensor comprises a three-dimensional (3D) depth sensor.

9. The tele-operation system of claim 1, wherein the display unit is configured to display an image showing a work environment of the slave robot transmitted from the slave robot, and display the real hand of the user detected by the sensor on the image in the form of augmented reality.

10. The tele-operation system of claim 9, wherein:
    the display unit is configured to display a space coordinate system of the real hand of the user and a space coordinate system of the real robot arm.

11. The tele-operation system of claim 9, wherein:
    the display unit is configured to display various information provided to manipulate the slave robot.

12. The tele-operation system of claim 1, further comprising:
    a master control unit configured to transmit a driving signal to the slave robot so that the slave robot moves by following the real hand of the user detected by the sensor.

13. The tele-operation system of claim 12, wherein:
    the master control unit is configured to determine space coordinates of the real hand of the user through information detected by the sensor.

14. The tele-operation system of claim 13, wherein:
    the master control unit is configured to transmit the determined space coordinates of the real hand of the user to the slave robot.

15. The tele-operation system of claim 12, wherein:
    the master control unit is configured to receive space coordinates of the real robot arm from the slave robot, and to convert the received space coordinates of the real robot arm to correspond to space coordinates of the real hand of the user.

16. The tele-operation system of claim 15, wherein:
    the master control unit is configured to transmit the converted space coordinates to the slave robot.

17. The tele-operation system of claim 12, wherein:
    the master control unit, when the real hand of the user moves after the real hand of the user is positioned at a position corresponding to the matching position of the real robot arm displayed on the display unit, is configured to transmit a driving signal to the slave robot so that the real robot arm of the slave robot moves by following a motion of the real hand of the user.

18. The tele-operation system of claim 17, wherein:
    the master control unit, when the real hand of the user positioned at the matching position of the real robot arm moves at a faster speed than a predetermined speed, is configured to stop a tele-operation of the slave robot by stopping transmitting the driving signal to the slave robot.

19. A method of controlling a tele-operation system having a master console and a slave robot, the method comprising:
    displaying a real robot arm of the slave robot and a real hand of a user on a display unit of the master console;
    determining whether a position of the real hand of the user displayed on the display unit is matched to a position of the real robot arm displayed on the display unit; and
    transmitting a driving signal to the slave robot positioned at a remote place from the master console when the position of the real hand of the user displayed on the display unit is matched to the position of the real robot arm of the slave robot displayed on the display unit, so that the real robot arm of the slave robot moves by following a motion of the real hand of the user,
wherein the displaying includes
 displaying the real hand of the user on the display unit in a form of augmented reality by detecting a position of the real hand of the user, and
 displaying a matching position of the real robot arm, the matching position being a position at which the real hand of the user displayed in the form of augmented reality is positioned to begin to control a motion of the real robot arm displayed in the form of augmented reality.

20. The method of claim 19, wherein the determining comprises:
 determining whether the real hand of the user is positioned at the matching position displayed on the real robot arm displayed on the display unit; and
 determining whether space coordinates of the real hand of the user are matched with space coordinates of the real robot arm.

21. The method of claim 19, wherein the transmitting comprises:
 detecting the position of the real hand of the user by the master console; and
 transmitting the driving signal to the slave robot, so that the real robot arm of the slave robot positioned at the remote place from the master console moves by following the position of the real hand of the user.

\* \* \* \* \*